United States Patent
Makino et al.

(10) Patent No.: US 8,126,625 B2
(45) Date of Patent: Feb. 28, 2012

(54) VEHICLE DRIVE ASSIST APPARATUS AND METHOD

(75) Inventors: Yasushi Makino, Mishima (JP);
Hideyuki Iwakiri, Tajimi (JP); Yuuichi Kubota, Okazaki (JP); Tomohiko Endo, Toyota (JP); Yukiko Kawabata, Toyota (JP); Miyuki Omori, Toyota (JP); Kiyotaka Moriizumi, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 408 days.

(21) Appl. No.: 12/513,934

(22) PCT Filed: Feb. 18, 2008

(86) PCT No.: PCT/JP2008/052670
§ 371 (c)(1),
(2), (4) Date: May 7, 2009

(87) PCT Pub. No.: WO2008/102735
PCT Pub. Date: Aug. 28, 2008

(65) Prior Publication Data
US 2010/0049413 A1 Feb. 25, 2010

(30) Foreign Application Priority Data
Feb. 20, 2007 (JP) ................................. 2007-039793

(51) Int. Cl.
*G06F 19/00* (2006.01)

(52) U.S. Cl. ........................................... 701/65; 701/73
(58) Field of Classification Search .................... 701/65, 701/70, 96, 48, 78, 93, 73; 340/932.2
See application file for complete search history.

(56) References Cited

U.S. PATENT DOCUMENTS

| 6,826,469 | B2 * | 11/2004 | Iwata et al. | ..................... 701/93 |
| 2005/0209762 | A1 * | 9/2005 | Lu et al. | ......................... 701/70 |

FOREIGN PATENT DOCUMENTS

| JP | 6 336174 | 12/1994 |
| JP | 11 313407 | 11/1999 |
| JP | 2003 205808 | 7/2003 |
| JP | 2003 237511 | 8/2003 |
| JP | 2006 291863 | 10/2006 |
| JP | 2007 8415 | 1/2007 |

\* cited by examiner

*Primary Examiner* — Thomas Black
*Assistant Examiner* — Marthe Marc-Coleman
(74) *Attorney, Agent, or Firm* — Oblon, Spivak, McClelland, Maier & Neustadt, L.L.P.

(57) ABSTRACT

A vehicle drive assist apparatus for assisting in driving a vehicle by varying drive torque of wheels that includes: a torque-up mechanism increasing the drive torque; a step detecting mechanism detecting a step that may exist on a road surface in a traveling direction of the vehicle; and a switching mechanism switching a status of control between a first status in which the torque-up mechanism is permitted to operate and a second status in which the torque-up mechanism is restricted to operate, wherein the switching mechanism forms the first status if the step is detected by the step detecting mechanism.

11 Claims, 13 Drawing Sheets

VEHICLE DRIVE ASSIST APPARATUS AND METHOD

TECHNICAL FIELD

The present invention relates to a vehicle drive assist apparatus and method for assisting in driving a vehicle by varying a drive torque of wheels.

BACKGROUND ART

JP2003-205808 A discloses a parking assist apparatus which includes torque-up means for increasing engine generating torque by a predetermined torque when an accelerator pedal is off in order to enlarge a control range of vehicle speed based on only the brake operation. According to this parking assist apparatus, when a driver presses down on the brake pedal and operates a shift lever to a reverse position, an instruction for performing torque-up of the engine is transmitted to an engine ECU from a parking assist ECU.

By the way, when a step exists in a path along which reverse traveling is planed, there may be a case where the vehicle cannot surmount the step even if maximum torque in a brake-off status is generated.

Regarding this, since the parking assist apparatus disclosed in JP2003-205808 A has the torque-up means for increasing engine generating torque at the time of accelerator pedal-off by a predetermined torque, it may be possible to avoid a situation in which the vehicle cannot surmount the step if the engine generating torque at the time of accelerator pedal off is increased up to such torque which enables the vehicle to surmount the step. With such an arrangement, convenience is increased under road situations with steps; however, convenience is conversely diminished under flat road situations, because under the flat road situations an increase in vehicle speed at the time of accelerator pedal off is promoted and thus the parking assist may be terminated due to an upper limit of the vehicle speed or the driver may become restless due to the unpredicted increase in vehicle speed.

DISCLOSURE OF INVENTION

Therefore, an object of the present invention is to provide a vehicle drive assist apparatus and a method which can vary torque in a manner adapted to road situations.

In order to achieve the aforementioned objects, according to the first aspect of the present invention, a vehicle drive assist apparatus for assisting in driving a vehicle by varying a drive torque of wheels is provided which comprises;

torque-up means for increasing the drive torque;

step detecting means for detecting a step which may exist on a road surface in a traveling direction of the vehicle; and switching means for switching a status of control between a first status in which the torque-up means is permitted to operate and a second status in which the torque-up means is restricted to operate, wherein the switching means forms the first status if the step is detected by the step detecting means.

According to the second aspect of the present invention, in the first aspect of the present invention, the step detecting means detects the step before the wheels of the vehicle reach the step.

According to the third aspect of the present invention, in the first aspect of the present invention, the step detecting means includes distance measuring means for detecting a distance with respect to an object within a detection area which has a shape of a sector in a side view, and if the step detecting means detects a candidate of the step in said detection area, the step detecting means makes the detection area smaller such that the detected candidate of the step is not included in the smaller detection area, and the step detecting means determines whether the detected candidate of the step is a step based on the detection result using the smaller detection area.

According to the fourth aspect of the present invention, in the second aspect of the present invention, the step detecting means detects the candidate of the step as a step if there is no object detected in the smaller detection area during a predetermined travel distance of the vehicle after the detection of the candidate of the step.

According to the fifth aspect of the present invention, in the second aspect of the present invention, the step detecting means determines the candidate of the step as an obstacle other than a step if there is an object detected in the smaller detection area during a predetermined travel distance of the vehicle after the detection of the candidate of the step.

According to the sixth aspect of the present invention, in the fourth or the fifth aspect of the present invention, the predetermined travel distance is set to a distance which corresponds to a reduced distance in making the detection area smaller.

According to the seventh aspect of the present invention, in the sixth aspect of the present invention, the smaller detection area is a detection area which is made smaller by an amount corresponding to a height of the candidate of the step.

According to the eighth aspect of the present invention, in any one of the third-seventh aspects of the present invention, the predetermined travel distance is set to a distance which corresponds to the height of the candidate of the step.

According to the ninth aspect of the present invention, in the first aspect of the present invention, the vehicle drive assisting apparatus further comprises vehicle height detecting means for detecting a height of the vehicle with respect to a road surface, wherein the step detecting means corrects the detection area in accordance with the height detected by the vehicle height detecting means.

According to the tenth aspect of the present invention, a vehicle drive assist apparatus for assisting in driving a vehicle by varying a drive torque of wheels is provided which is configured to determine whether a step exists on a road surface in a traveling direction of the vehicle, and permit a torque-up operation for increasing the drive torque if it is determined that the step exists on the road surface in the traveling direction of the vehicle.

According to the eleventh aspect of the present invention, a vehicle drive assist method of assisting in driving a vehicle by varying a drive torque of wheels is provided which comprises;

a step detecting step for determining whether a step exists on a road surface in a traveling direction of the vehicle; and a step for permitting a torque-up operation for increasing the drive torque if it is determined that the step exists on the road surface in the step detecting step.

The twelfth aspect of the present invention is related to a storage medium on which a computer readable program which makes a computer execute the method according to the eleventh aspect of the invention is recorded.

According to the present invention, a vehicle drive assist apparatus and a method are provided which can vary torque in a manner adapted to road situations.

BRIEF DESCRIPTION OF THE DRAWINGS

These and other objects, features, and advantages of the present invention will become more apparent from the following detailed description of preferred embodiments given with reference to the accompanying drawings, in which.

Figure 1:
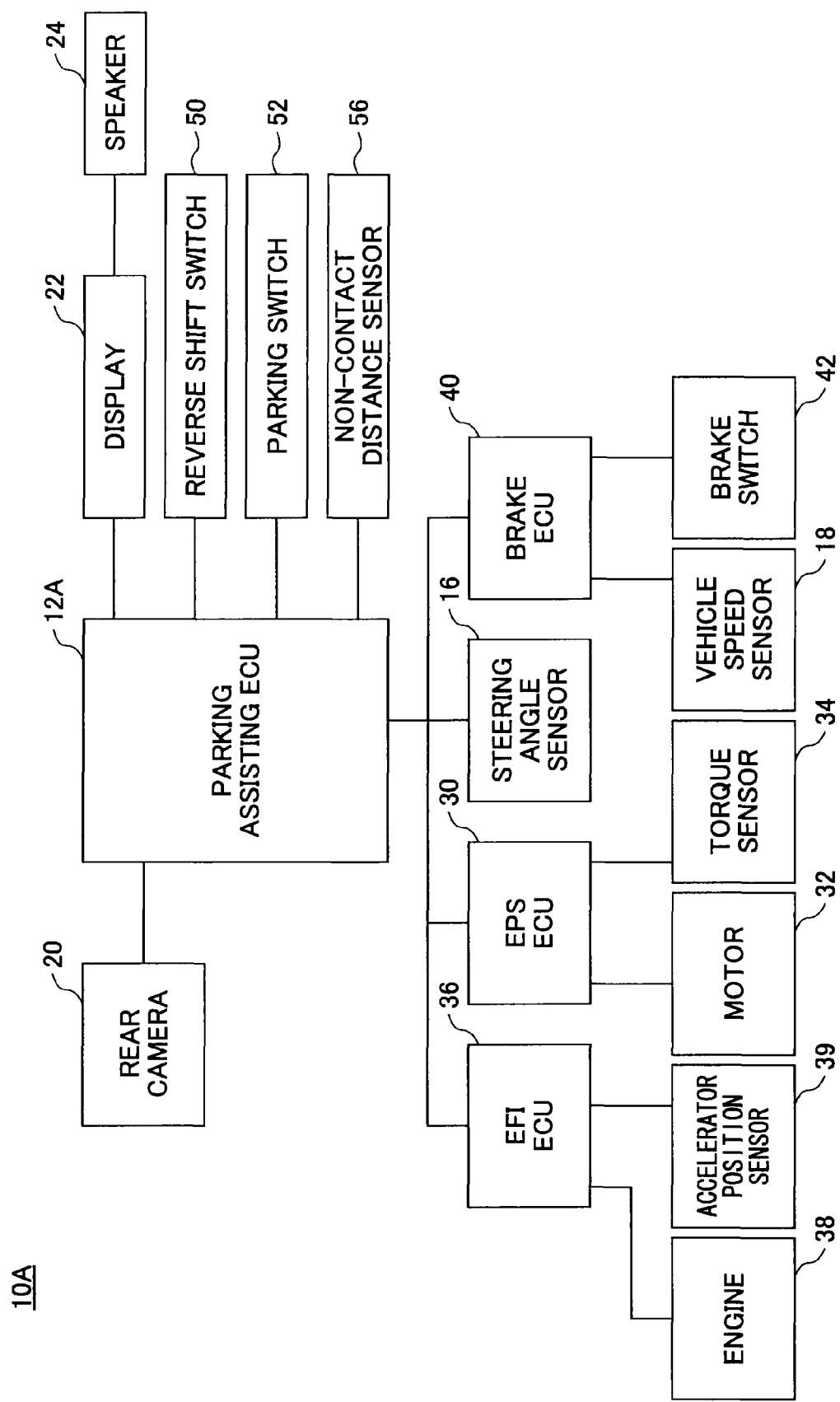
FIG. 1 is a system diagram of an embodiment of a vehicle drive assist apparatus 10A according to the first embodiment.

EXPLANATION FOR REFERENCE NUMBER 10A, 10B, 10C vehicle drive assist apparatus
12A, 12B, 12C parking assisting ECU
16 steering angle sensor
18 vehicle speed sensor
20 rear camera
22 display
24 speaker
30 EPS ECU
32 motor
34 torque sensor
36 EFI ECU
38 engine
39 accelerator position sensor
40 brake ECU
42 brake switch
50 reverse shift switch
52 parking switch
56 non-contact distance sensor
58 ultrasonic sensor
60 vehicle height sensor
80 target parking frame

BEST MODE FOR CARRYING OUT THE INVENTION

In the following, the best mode for carrying out the present invention will be described in detail by referring to the accompanying drawings.

First Embodiment

FIG. 1 is a system diagram of an embodiment of a vehicle drive assist apparatus 10A according to the first embodiment. As shown in FIG. 1, the vehicle drive assist apparatus 10A is comprised mainly of an electronic control unit 12A (hereafter referred to as a parking assisting ECU 12A). The parking assisting ECU 12A is comprised mainly of a microprocessor that includes a CPU, a ROM, a RAM, etc., (not shown) which are interconnected via appropriate buses. In the ROM are stored the computer readable programs to be carried out by the CPU and data.

The parking assisting ECU 12A is connected to a steering angle sensor 16 for detecting a steering angle of a steering wheel (not shown), an EPS ECU 30 for controlling a motor 32 of a power steering apparatus, an EFI ECU 36 for controlling an engine 38, a brake ECU for controlling brake actuators, etc., via an adequate bus such as CAN (Controller Area Network) or high speed communication bus, etc. The motor 32 may be disposed in a steering column for rotating a steering shaft by its rotating. The EFI ECU 36 is connected to an accelerator position sensor 39 for detecting an amount of operation of an accelerator pedal. The EPS ECU 30 is connected to a torque sensor 34 for detecting a steering torque of the steering wheel. The brake ECU is connected to a vehicle speed sensor 18 for detecting a vehicle speed and a brake switch which outputs an ON signal when the brake pedal is operated. The accelerator position sensor 39 may a sensor for detecting the operated stroke of the accelerator pedal, or may be a throttle position sensor.

Further, the parking assisting ECU 12A is connected to a rear camera 20 for imaging a scene of a predetermined angular range behind the vehicle, and a display 22 disposed in the cabin of the vehicle. The display 22 is connected to speakers 24.

The parking assisting ECU 12A is also connected to a reverse shift switch 50 and a parking switch 52. The reverse shift switch 50 outputs an ON signal when a shift lever is shifted to the reverse position and otherwise outputs an OFF signal. The parking switch 52 is provided in the cabin of the vehicle so as to allow a user in the cabin to operate it. The parking switch 52 outputs an OFF signal in its normal state and outputs an ON signal when operated by the user. The parking assisting ECU 12A determines whether the user needs assistance in parking the vehicle based on the output signal of the parking switch 52.

Figure 2:
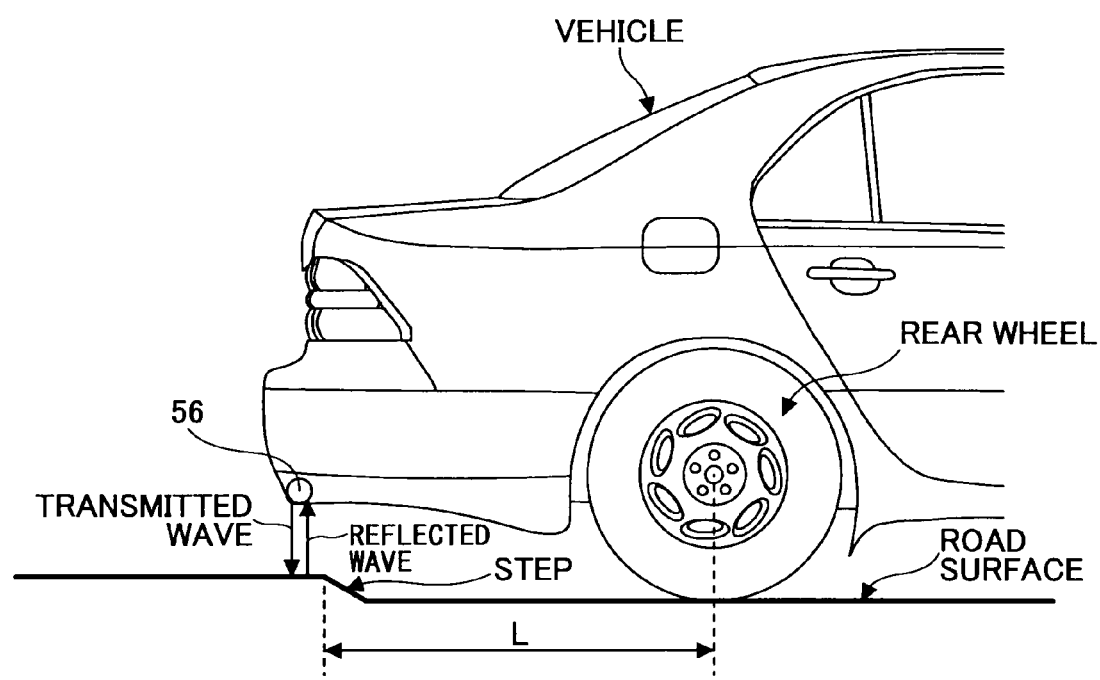
FIG. 2 is a diagram for illustrating the way of detecting a step using a non-contact distance sensor 56.

The parking assisting ECU 12A is also connected to a non-contact distance sensor 56. The non-contact distance sensor 56 is mounted on a rear portion (a lower portion of a rear bumper in the illustrated embodiment) which is located rearward of the rear wheels of the vehicle, as shown in FIG. 2. The non-contact distance sensor 56 detects a distance h (in a vertical direction) between the mounted position and the ground. The non-contact distance sensor 56, as shown in FIG. 2 for example, outputs detection waves toward the ground in a vertical direction, receives reflected waves of the detection waves reflected on the ground, and detects the distance h between the mounted position and the ground based on a delayed time of the reflected waves. It is noted that a plurality of non-contact distance sensors 56 may provided along a width direction of the vehicle. For example, a non-contact distance sensor 56 may be provided on each side of the vehicle.

Next, a fundamental process implemented by parking assisting ECU 12A at the time of parking assistance is described.

Figure 3:
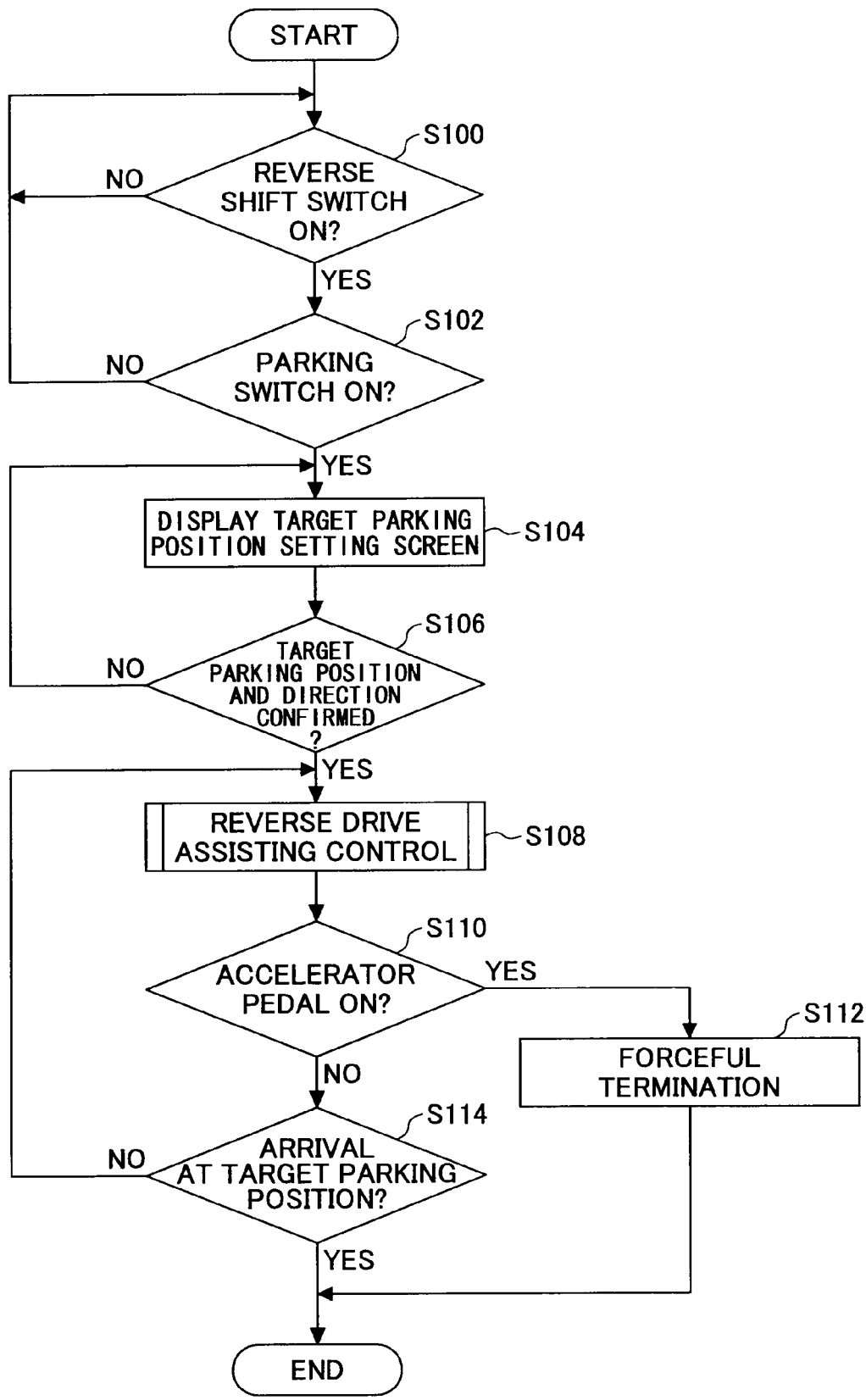
FIG. 3 is a flowchart of a fundamental process implemented by a parking assisting ECU 12A at the time of parking assistance.

FIG. 3 is a flowchart of a fundamental process implemented by the parking assisting ECU 12A at the time of parking assistance.

In step 100, the parking assisting ECU 12A determines whether the reverse shift switch 50 is turned on. If it is determined that the reverse shift switch 50 is turned on, the process routine goes to step 102. Otherwise, the process routine at this interval terminates without doing anything.

In step 102, the parking assisting ECU 12A determines whether the parking switch 52 is turned on. If it is determined that the parking switch 52 is turned on, the process routine goes to step 104. Otherwise, the process routine at this interval terminates without doing anything.

Figure 4:
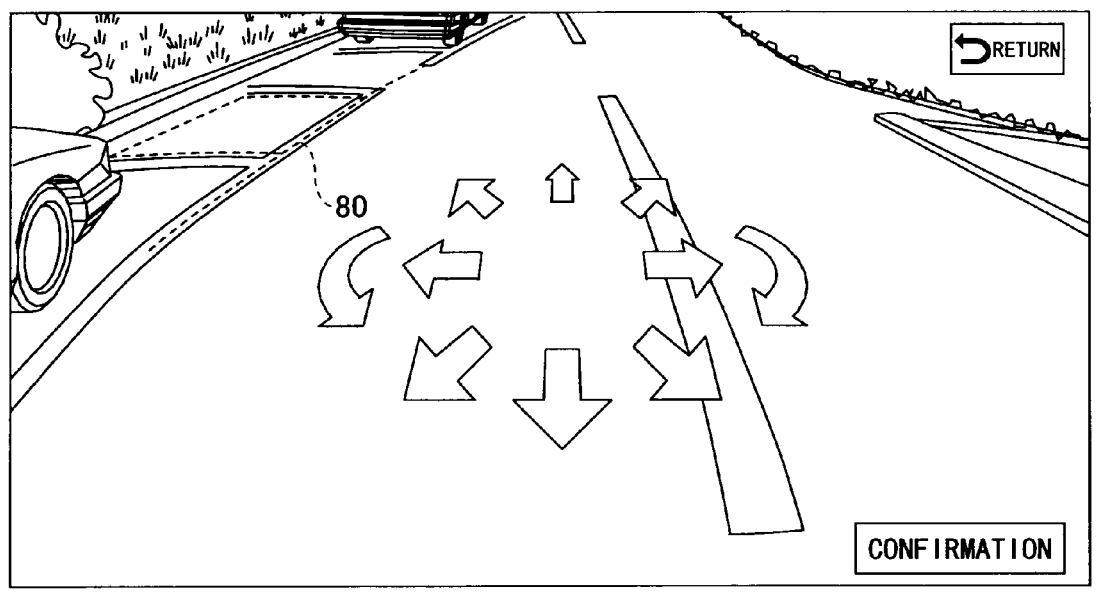
FIG. 4 is a diagram for illustrating an example of a screen for setting a target parking position, and etc., for tandem type parking.

In step 104, the parking assisting ECU 12A displays a target parking position setting screen on the display 22. Specifically, the parking assisting ECU 12A displays an image (i.e., real image) captured by the rear camera 20 on the display 22 and superimposes a target parking frame 80 on the image, as shown in FIG. 4 (which shows a screen for tandem type parking). The target parking frame 80 may be a pictorial display which imitates an actual parking frame or an outside shape of the vehicle. For example, the target parking frame 80 has a form whose position and direction users can recognize. The position and direction of the target parking frame 80 may be adjusted with touch switches, etc., for moving the target parking frame in lateral and longitudinal directions and in directions of rotation, as shown in FIG. 4, before operating the confirmation switch.

In next step 106, the parking assisting ECU 12A determines whether the position and direction of the target parking frame 80 are confirmed. In this example, the parking assisting ECU 12A determines that the position and direction of the target parking frame 80 are confirmed when a confirmation switch shown in FIG. 4 is operated by a user. If the position and direction of the target parking frame 80 are confirmed, the process routine goes to step 108. Then, the parking assisting ECU 12A determines the target parking position and the target parking direction based on the position and direction of the target parking frame 80 confirmed, and determines a target track based on the determined target parking position and target parking direction in advance. If the position and direction of the target parking frame 80 have not been confirmed yet, the process routine returns to step 104 to continue the setting process of the target parking position, etc.

In step 108, the parking assisting ECU 12A performs reverse drive assisting control. The reverse drive assisting control includes steering assisting control for assisting steering operation at the time of reverse driving, and step torque-up control explained later with reference to FIG. 5. The steering assisting control may be as follows, for example. When the pressing down of the brake pedal is canceled for a reverse driving creep torque to be generated and therefore the vehicle starts to roll backward, the parking assisting ECU 12A estimates the position of the vehicle during the parking assist control using the travel distance of the vehicle derived from the output signals of the vehicle speed sensor 18 and the steering position derived from the output signals of the steering angle sensor 16. Then, the parking assisting ECU 12A calculates a target steering angle as a function of the amount of departure of the estimated vehicle position from the target track. The parking assisting ECU 12A transmits the calculated target steering angle to the EPS ECU 30. The EPS ECU 30 controls the motor 32 so as to implement the target steering angle.

In step 110, the parking assisting ECU 12A determines whether the accelerator pedal is operated based on the information of the accelerator position sensor 39 obtained via the EFI ECU 36. If it is determined that the accelerator pedal is operated, the process routine goes to step 112, while if it is determined that the accelerator pedal is not operated, the process routine goes to step 114.

In step 112, the parking assisting ECU 12A immediately discontinues (i.e., forcefully terminates) the reverse drive assisting control in progress now. It is noted that the discontinuation or forceful termination of the reverse drive assisting control may be implemented in other situations, such as when the obstacle is detected, when the vehicle speed exceeds a predetermined upper limit, when the operation of the steering wheel with a torque more than a predetermined torque by the user is detected based on the torque sensor 34, etc.

In step 114, the parking assisting ECU 12A determines whether the own vehicle has arrived at the target parking position based on the estimation result of the vehicle position of the own vehicle. If it is determined that the own vehicle has arrived at the target parking position, the parking assisting ECU 12A requests the driver to stop the vehicle via the speaker 24 for example (or automatically stops the vehicle via the brake ECU 40), and then the parking assisting process is completed. If it is determined that the own vehicle has not arrived at the target parking position yet, the process routine returns to step 108 to continue the reverse drive assisting control.

Figure 5:
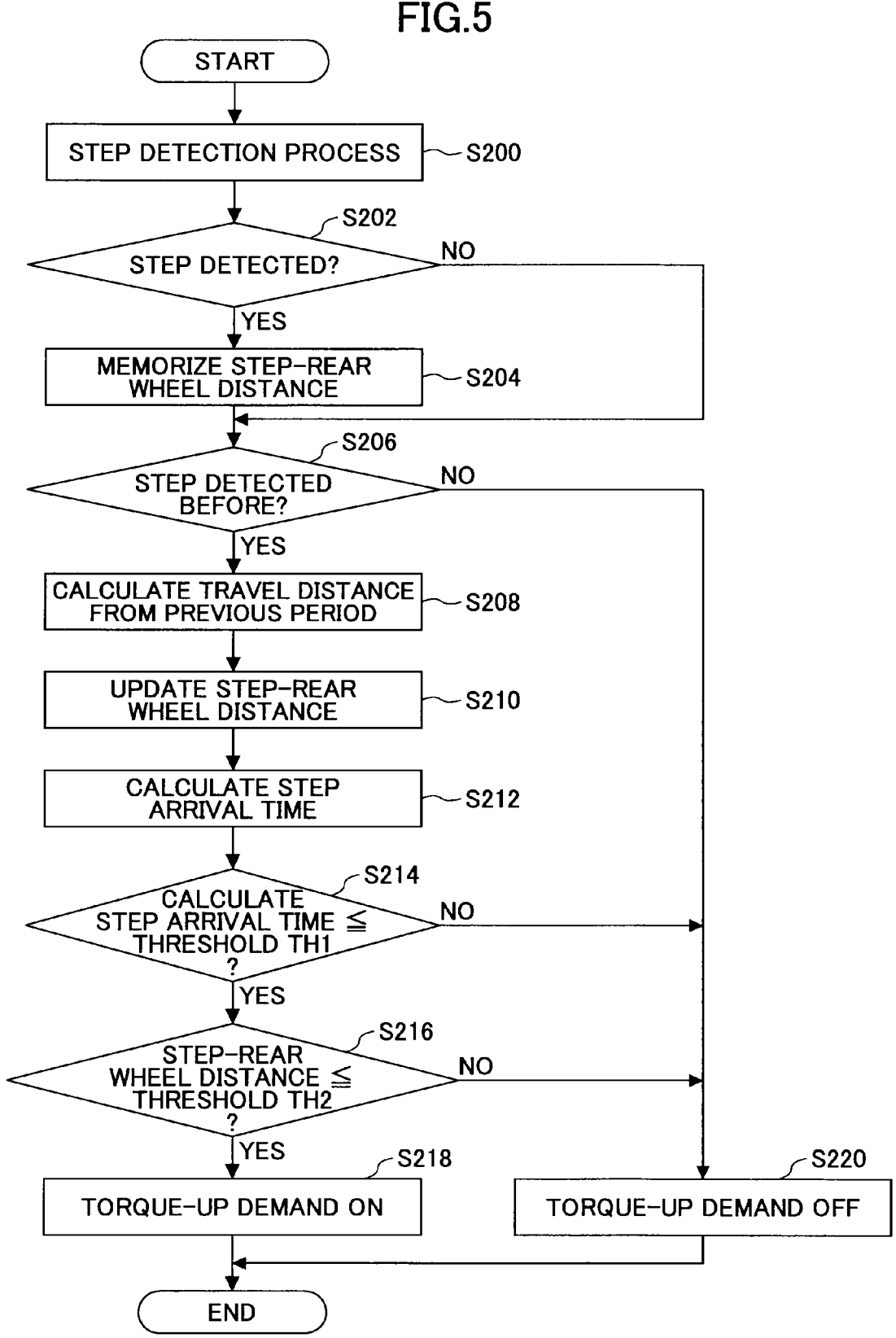
FIG. 5 is a flowchart of an example of a step torque-up control.

FIG. 5 is a flowchart of an example of step torque-up control which is performed as a part of the reverse drive assisting control in step 108 in FIG. 3. The process routine shown in FIG. 5 is executed repeatedly while the aforementioned reverse drive assisting control is continued.

In step 200, the parking assisting ECU 12A performs a process for detecting a step which may exist ahead in a traveling direction of the vehicle (the traveling direction corresponds to a backward direction in this example) based on output results of the non-contact distance sensor 56 (i.e., detected distance h between the ground and the mounted position). For example, if the difference between the distance h (i−1) detected in the previous period and the distance h (i) detected in the current period (i.e., a road surface displacement) is more than a predetermined distance, the parking assisting ECU 12A determines that a step is detected ahead in the traveling direction of the vehicle and thus sets a step detection flag to a value "1". The predetermined distance may be a value corresponding to a height (3 cm, for example) which could not be surmounted without the torque-up mentioned later. The parking assisting ECU 12A keeps an initial value "0" of the step detection flag when the step is not detected at this period.

In step 202, the parking assisting ECU 12A determines whether the step is detected at this period based on the result of the step detection process in step 200. If the step is detected at this period, that is to say, if the step detection flag is set to "1", the process routine goes to step 204. On the other hand, if the step detection flag remains to be an initial value "0", the process routine goes to step 206. It is noted that once the step detection flag is "1", it is held to be "1" until it is determined in step 216 mentioned later that the vehicle has surmounted the step.

In step 204, the parking assisting ECU 12A stores in a predetermined memory a distance L between the step and the rear wheel (see FIG. 2) at the point where the step is initially detected as an initial value L0 of the step-rear wheel distance L.

In step 206, the parking assisting ECU 12A determines whether the step was already detected before the current period during the reverse drive assisting control of this time is being performed.

Specifically, if the step detection flag is "1", the parking assisting ECU 12A determines that the step was already detected before the current period. If it is determined that the step was already detected before the current period, the process routine goes to step 208. On the other hand, if it is determined that the step was not detected before the current period (i.e., the step has not been detected yet), the process routine goes to step 220.

In step 208, the parking assisting ECU 12A calculates a travel distance d (i) of the vehicle from the previous period (i−1) to the current period (i) based on output signals of the vehicle speed sensor 18. The travel distance d (i) of the vehicle may be calculated by integrating in time the output signals of the vehicle speed sensor 18 (i.e., wheel speed pulses) over time interval from the previous period to the current period. It is noted that this travel distance d (i) may be calculated by another ECU such as the brake ECU 40 for example, and in this case the parking assisting ECU 12A acquires the travel distance d (i) from the other ECU.

In step 210, the parking assisting ECU 12A updates the step-rear wheel distance L based on the travel distance d (i) of the vehicle calculated in the step 208. Specifically, the parking assisting ECU 12A calculates the step-rear wheel distance L (i) of this period using such a relationship L (i)=L (i−1)−d (i), where L (i) is the step-rear wheel distance of this period and L (i−1) is the step-rear wheel distance of the previous period. It is noted that the initial value L0 stored in step 204 is used as L (k) of the period (k) in which the step is initially detected.

In step 212, the parking assisting ECU 12A predicts a time T (referred to as a "step arrival time T" hereafter) when the rear wheel arrives at the step from the current time based on the step-rear wheel distance L (i) of this period calculated in step 210. The step arrival time T (i) of this period may be predicted by dividing the step-rear wheel distance L (i) of this period by the vehicle speed V (i) detected at this period based on the output signals of the vehicle speed sensor 18.

In step 214, the parking assisting ECU 12A determines whether the step arrival time T (i) of this period calculated in step 212 is smaller than or equal to a predetermined threshold Th1. The predetermined threshold Th1 may be a value corresponding to a time required to complete torque-up to a target torque from starting of the torque-op mentioned later. If it is determined that the step arrival time T (i) of this period is smaller than or equal to the predetermined threshold Th1, the process routine goes to step 216, and otherwise the process routine goes to step 220.

In step 216, the parking assisting ECU 12A determines whether the step-rear wheel distance L (i) of this period calculated in step 210 is greater than of equal to a predetermined threshold Th2. This determination process is for determining whether the vehicle has surmounted the step detected in step 202. Thus, the predetermined threshold Th2 may be a negative value (−1 m, for example). If it is determined that the step-rear wheel distance L (i) of this period is greater than of equal to a predetermined threshold Th2, that is to say, if the vehicle has not surmounted the step yet, the process routine goes to step 218. Otherwise (i.e., if the vehicle has surmounted the step), the step detection flag is set to "0" and the process routine goes to step 220.

In step 218, the parking assisting ECU 12A turn on a torque-up demand for the EFI ECU 36. For example, the parking assisting ECU 12A transmits an instruction for performing torque-up to the EFI ECU 36. In response to this, EFI ECU 36 controls the RPM of the engine 38 so that the reverse driving creep torque may become a target torque. For example, since the relationship between the RPM of the engine 38 at idle and the reverse driving creep torque generated at that time can be derived in advance, EFI ECU 36 controls the RPM of the engine 38 so as to implement a target RPM corresponding to the target torque. It is noted that the reverse driving creep torque is a torque which is generated when a shift lever is in a reverse position and both of the accelerator pedal and the brake pedal are in off state, and is a torque which is generated due to the existence of a torque converter in automatic transmission vehicles. It is noted that the target torque may be a fixed value with which the vehicle can surmount the step detected, or may be a variable value according to the height of the step detected.

In step 220, the parking assisting ECU 12A turn off the torque-up demand for the EFI ECU 36. For example, the parking assisting ECU 12A transmits an instruction for stopping torque-up to the EFI ECU 36. In response to this, depending on the current situation of torque-up, EFI ECU 36 stops torque-up if the torque-up is in progress, and maintains the current inactive status if the torque-up is not being carried out now. It is noted that the stopping of torque-up during the traveling of the vehicle may be implemented such that the RPM gradually returns to the original normal RPM (i.e., the RPM corresponding to the reverse driving creep torque in a normal status) in order to prevent the driver from feeling abnormal due to a sharp drop in the reverse driving creep torque.

According to the vehicle drive assist apparatus 10A of this embodiment, the following effect among others can be obtained.

According to this embodiment, as mentioned above, it becomes possible to implement a configuration in which torque-up is performed when the step is detected. In other words, it becomes possible to set an appropriate reverse driving creep torque depending on the status of the step such that torque-up is performed in a situation where torque-up is necessary due to the presence of the step while torque-up is not performed where torque-up is not necessary because of absence of the step (i.e., a flat road). With this arrangement, it becomes possible to avoid inconvenience which would occur when unnecessary torque-up is performed in road situations without steps, such as inconvenience which would occur when the reverse drive assisting control is forcefully terminated unintentionally because the vehicle speed increases due to the torque-up, and inconvenience which would occur when the driver becomes restless due to unpredicted increase in a vehicle speed, for example, as well as inconvenience which would occur when the steps cannot be surmounted in road situations with steps.

Furthermore, according to this embodiment, as mentioned above, it becomes possible to complete torque-up in advance before the rear wheel arrives at the step, because the torque-up is initiated before the rear wheel arrives at the step if the step is detected. Specifically, if torque-up is initiated when the rear wheel arrives at the step, users have to wait for a time required to complete the torque-up (i.e., until a ready status in which a target torque can be generated); however, according to this embodiment, it becomes possible to improve convenience by eliminating such necessity of waiting. Further, according to this embodiment, since torque-up is completed before the rear wheel arrives at the step, it becomes easier for users to give momentum to the vehicle before the vehicle reaches the step so that the vehicle may surmount the step.

Second Embodiment

Figure 6:
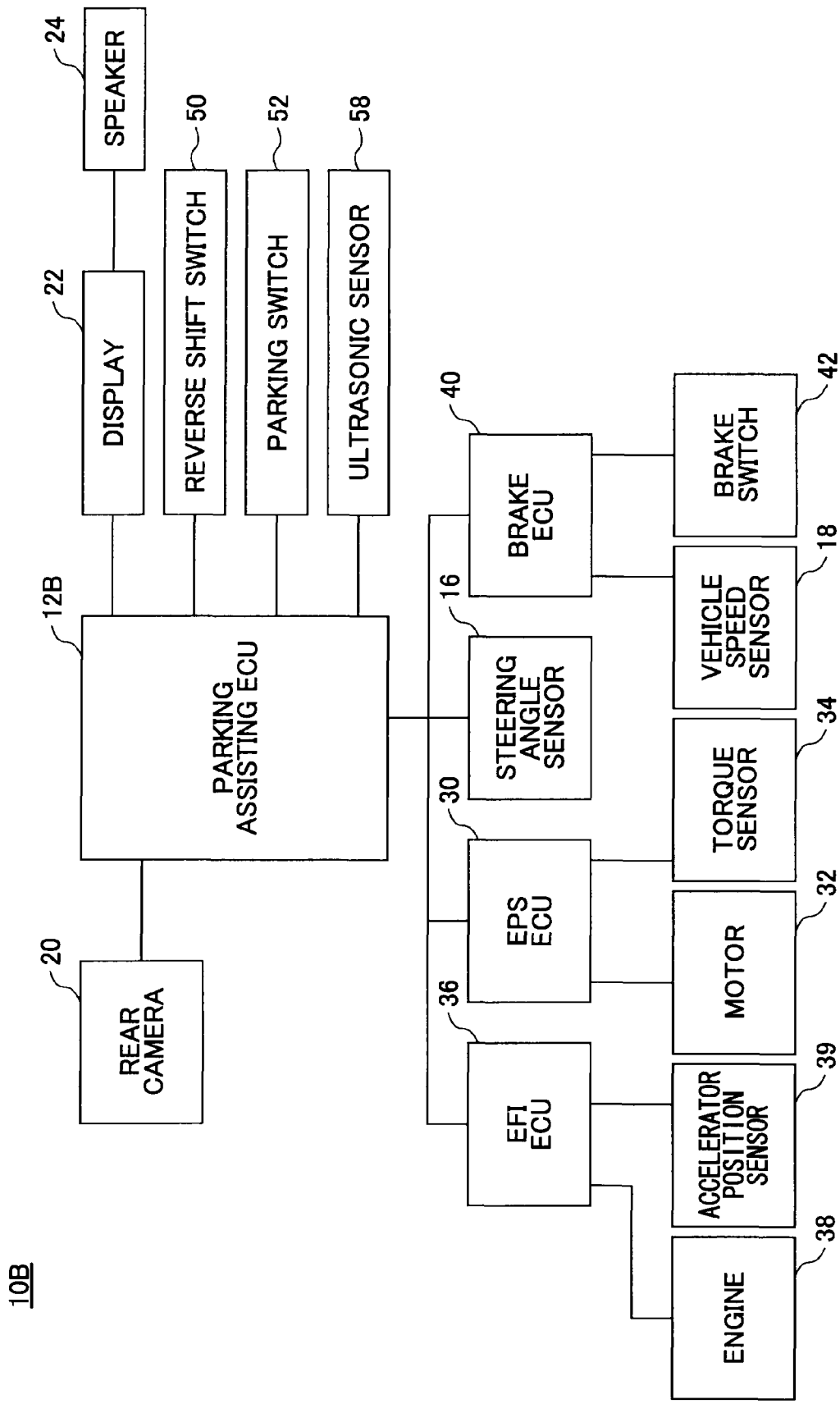
FIG. 6 is a system diagram of an embodiment of a vehicle drive assist apparatus 10B according to the second embodiment.

FIG. 6 is a system diagram of an embodiment of a vehicle drive assist apparatus 10B according to the second embodiment. As shown in FIG. 6, the vehicle drive assist apparatus 10B is comprised mainly of an electronic control unit 12B (hereafter referred to as a parking assisting ECU 12B).

In this second embodiment, the parking assisting ECU 12B is provided with an ultrasonic sensor 58 as the non-contact distance sensor 56 in the vehicle drive assist apparatus 10A according to the first embodiment, as shown in FIG. 6. Other components may be the same as those in the vehicle drive assist apparatus 10A according to the first embodiment, and thus explanation is omitted by giving them the same referential numerals.

Figure 7:
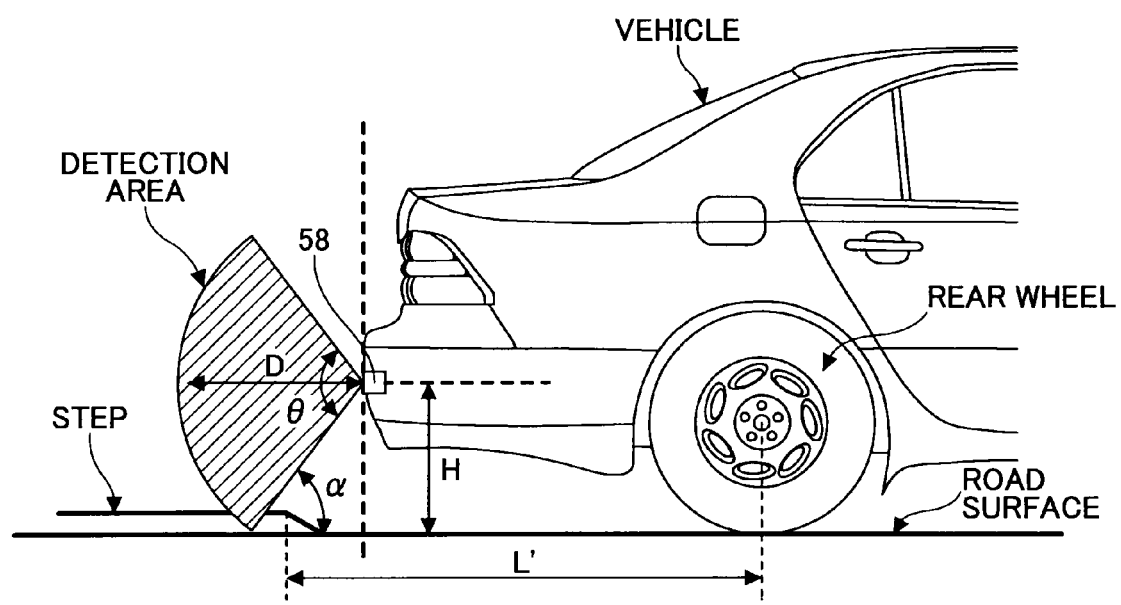
FIG. 7 is a diagram for illustrating an example of a detection area of an ultrasonic sensor 58.

The ultrasonic sensor 58 has a radial detection area with substantially sector form as seen in a side view, as shown in FIG. 7. According to the detection area shown in FIG. 7, its detection distance is D m, its detection angle range is θ, and an inclination angle of the lowest radiation direction with respect to the ground is α. The detection area is varied as mentioned later. For example, the detection distance D is varied. The ultrasonic sensor 58 emits ultrasonic waves within the detection area and receives the reflected waves from the detection area to detect objects within the detection area. Specifically, if the object exists in the detection area, the ultrasonic waves reflected from the object are received by the ultrasonic sensor 58. The ultrasonic sensor 58 detects the distance of the object in the detection area (i.e., the distance between the object and the ultrasonic sensor 58) based on the delay time of these reflected waves.

Figure 8:
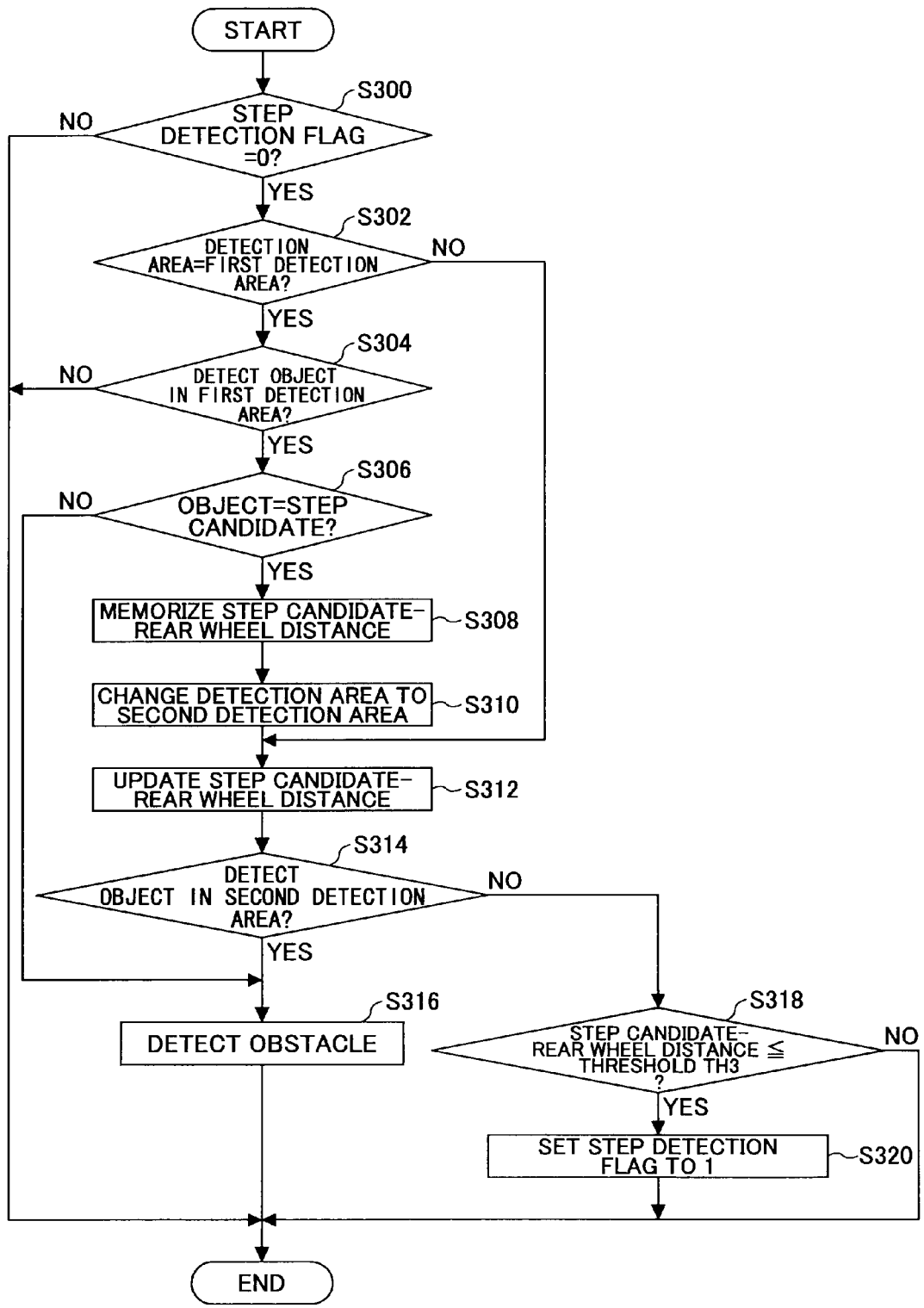
FIG. 8 is a flowchart of an example of a step torque-up control according to the second embodiment.

FIG. 8 is a flowchart of an example of a step detection process which is performed as a part of the step torque-up control in FIG. 5 which is described with reference to the first embodiment. The process routine shown in FIG. 8 is performed as a process of step 200 in FIG. 5 described with reference to the first embodiment. The process routine shown in FIG. 8 is performed repeatedly while the step detection flag is "0" (i.e., while no step is detected) during the reverse drive assisting control. It is noted that other fundamental processes implemented by the parking assisting ECU 12B may be the same as the respective steps in FIGS. 3 and 5 with reference to the first embodiment.

In step 300, the parking assisting ECU 12B determines whether the step detection flag is "0". If it is determined that the step detection flag is "0", the process routine goes to step 302. On the other hand, if the step detection flag is "1" (i.e., if the step was detected before the current period), the process routine of this period shown in FIG. 8 terminates and the process routine goes to step 202 of the flowchart shown in FIG. 5.

In step 302, the parking assisting ECU 12B determines whether the current detection area of the ultrasonic sensor 58 is a first detection area (i.e., a normal detection area). The first detection area is such a detection area with which a step which may exist on the road surface can be detected and may be such a detection area with which a flat road surface cannot be detected as shown in FIG. 7. Here, it is assumed that the detection distance D of the first detection area (see FIG. 9A) is D1. It is noted that it is assumed that the detection area of the ultrasonic sensor 58 is initially set to the first detection area. If it is determined that the current detection area of the ultrasonic sensor 58 is the first detection area, the process routine goes to step 304. Otherwise (i.e., if the current detection area of the ultrasonic sensor 58 is a second detection area mentioned later), the process routine skips to step 312.

In step 304, the parking assisting ECU 12B determines whether an object is detected in the first detection area based on the detection result of the ultrasonic sensor 58 obtained at this period. If the object is detected in the first detection area, the process routine goes to step 306. On the other hand, if the object is not detected in the first detection area, the process routine of this period shown in FIG. 8 terminates and the process routine goes to step 202 of the flowchart shown in FIG. 5.

Figure 9:
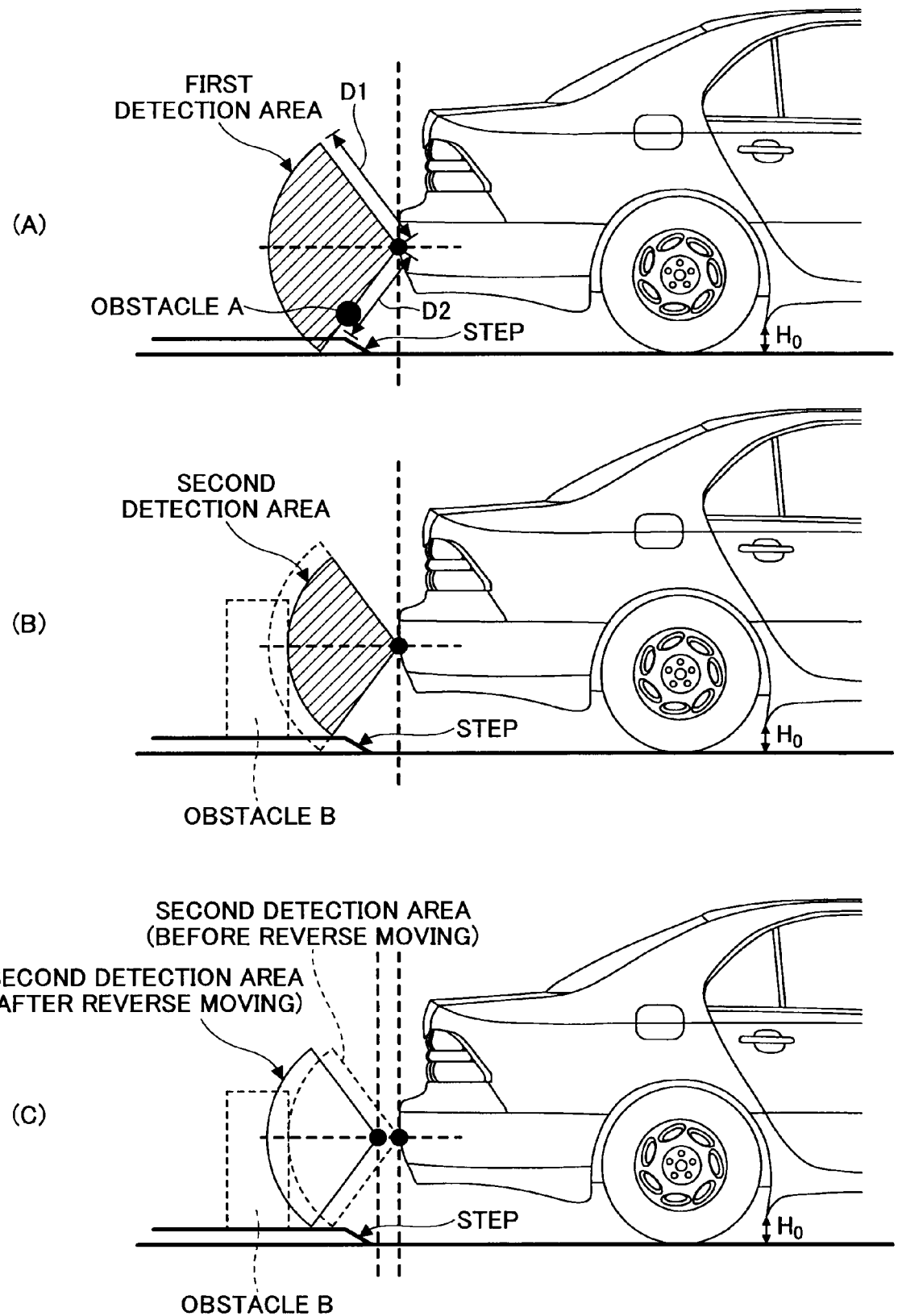
FIG. 9 is a diagram for illustrating a manner in which the detection area of the ultrasonic sensor 58 is changed and a manner in which an obstacle and the step are distinguished.

In step 306, the parking assisting ECU 12B determines whether the object detected in step 304 is a step candidate. For example, the parking assisting ECU 12B may determine that the object is a step candidate if the object is detected in a range of distance between D2 and D1 from the mounting position of the ultrasonic sensor 58 as shown in FIG. 9A. D2 is the detection distance of the second detection area mentioned later, and described later in detail. If the object is the step candidate, the process routine goes to step 308. On the other hand, if the object is not the step candidate, the process routine goes to step 316, determining that the object is an obstacle such as an obstacle A shown in FIG. 9A.

In step 308, the parking assisting ECU 12B stores in a predetermined memory a distance L' between the step candidate and the rear wheel (see FIG. 7) at the point where the step candidate is detected in step 306 as an initial value L'0 of the step candidate-rear wheel distance L.

In step 310, the parking assisting ECU 12B changes the detection area of the ultrasonic sensor 58 from the first detection area to the second detection area. The second detection area is formed by making the first detection area as shown in FIG. 9A smaller such that the step candidate may not be detected therein, as shown in FIG. 9B. The second detection area has the same detection angle range θ as that of the first detection area and its detection distance D may be D3 which is smaller than D2, as shown in FIG. 9B. The reduced amount ΔD (=D2−D3) of the detection area D may be a fixed value corresponding to Hmax×1/sin α, where Hmax is the maximum height of the target step to be surmounted by torque-up. Of course, the reduced amount ΔD of the detection area D may be a fixed value obtained by adding a predetermined margin to Hmax×1/sin α. However, the reduced amount ΔD of the detection area D is set smaller than H0×1/sin α, where H0 is the minimum height of the lower portion of the vehicle (see FIG. 9A). The change of the detection area D may be implemented by changing the transmission power of the ultrasonic waves emitted, for example, or may be implemented by masking the object data (i.e., distance data) exceeding detection distance D as noise.

In step 312, the parking assisting ECU 12B calculates a travel distance d(i) of the vehicle from the previous period (i−1) to the current period (i) based on output signals of the vehicle speed sensor 18, and updates the step candidate-rear wheel distance L' based on the calculated travel distance d(i) of the vehicle. Specifically, the parking assisting ECU 12B calculates the step candidate-rear wheel distance L' (i) of this period using such a relationship L' (i)=L' (i−1)−d (i), where L' (i) is the step candidate-rear wheel distance of this period and L' (i−1) is the step candidate-rear wheel distance of the previous period. It is noted that the initial value L'0 stored in step 306 is used as L' (k) of the period (k) in which the step candidate is initially detected.

In step 314, the parking assisting ECU 12B determines whether an object is detected within the second detection area based on the detection result of the ultrasonic sensor 58 obtained at this period. If the object is detected in the second detection area, the process routine goes to step 316. On the other hand, if the object is not detected in the second detection area, the process routine goes to step 318. It is noted that if the detection area of the ultrasonic sensor 58 is changed from the first detection area to the second detection area, no static object can be detected in the second detection area unless the vehicle moves after that.

In step 316, the parking assisting ECU 12B determines that there is an obstacle ahead in the traveling direction of the vehicle, sets an obstacle detection flag to "1", and goes to step 202 of the flowchart in FIG. 5. It is noted that if the obstacle detection flag is set to "1", the process of step 112 in FIG. 3 (i.e., forceful termination process) is performed at that period. In this way, if the obstacle is detected, the reverse drive assisting control is terminated immediately, and thus torque-up is not performed.

In this step 316, if the process routine goes to step 316 via step 314, for example, the parking assisting ECU 12B determines that the step candidate detected in step 306 is an obstacle other than a target step to be surmounted. For example, the obstacle B shown in FIG. 9B is detected as a step candidate with the first detection area as is the case with the step, but afterward the obstacle B is detected in the second detection area while the vehicle moves in reverse by a distance corresponding to reduced amount (D1−D2) of the detection distance D, as shown in FIG. 9C. In this way, the obstacle other than the step to be surmounted is detected in step 316 (or step 306).

In step 318, the parking assisting ECU 12B determines whether the step candidate-rear wheel distance L' (i) of this period calculated in step 312 is smaller than or equal to a predetermined threshold Th3. The predetermined threshold Th3 may be a value (=L'0−D1+D2) obtained by subtracting a difference (=D1−D2) between the detection distance D1 of the first detection area and the detection distance D2 of the second detection area from an initial value of the step candidate-rear wheel distance L'0. In other words, the reduced amount when the detection area is changed from the first detection area to the second detection area is made up for by the movement of the vehicle afterward. If the step candidate-rear wheel distance L' (i) of this period is smaller than or equal to the predetermined threshold Th3, the process routine goes to step 320. Otherwise, the process routine of this period shown in FIG. 8 terminates and the process routine goes to step 202 of the flowchart shown in FIG. 5.

In step 320, the parking assisting ECU 12B determines that the step candidate detected in step 306 is a step, sets the step detection flag to "1" and goes to step 202 of the flowchart shown in FIG. 5. This is because the probability that the step candidate is a step is very high if no object is detected in the second detection area while the vehicle moves in reverse by the distance corresponding to the reduced amount (=D1−D2) of the detection distance D, as shown in FIG. 9B. For example, if the obstacle B as shown in FIG. 9B does not exist and only the step exists, no object is detected while the vehicle moves in reverse by the distance corresponding to the reduced amount (=D1−D2) of the detection distance D, as shown in FIG. 9C. This embodiment utilizes such a fact in order to prevent the obstacle detected at the substantially equal distance as a step with the first detection area from being detected as a step by mistake.

If the step detection flag is set to "1" in this step 320, an affirmative determination is made in step 202 in the subsequent process routine from step 202 of the flowchart shown in FIG. 5, and thus torque-up demand is output at an appropriate stage afterward. It is noted that in step 202 of the flowchart shown in FIG. 5 the step-rear wheel distance L is calculated using the step candidate-rear wheel distance L' calculated in step 312.

According to the vehicle drive assist apparatus 10B of this second embodiment, the following effect among others can be obtained in addition to the above-mentioned effect according to the first embodiment.

As mentioned above, since the ultrasonic sensor 58 which functions as obstacle detecting means is also used to detect a step, it is possible to implement a more efficient configuration in comparison to the configuration in which separate sensors are used for detecting an obstacle and a step. In particular, if the ultrasonic sensor 58 is clearance sonar for detecting an obstacle behind the vehicle, it is possible to detect the step for which torque-up is necessary in the detection area of the clearance sonar without adding new hardware resources.

Further, as mentioned above, it is possible to discriminate between an obstacle and a step with high accuracy by varying the detection area of the ultrasonic sensor 58. In other words, as mentioned above, it is possible to detect both of the obstacle and the step in a distinguishable manner with high accuracy by appropriately selecting the first detection area or the second detection area.

As to the vehicle drive assist apparatus 10B according to this second embodiment, the following modification or improvement among others can be contemplated.

For example, a plurality of the ultrasonic sensors 58 may be provided along the width direction of the vehicle. In this case, the above-mentioned first detection area or the second detection area may be applied to each of the ultrasonic sensors 58. In this case, if the obstacle is detected by any of ultrasonic sensors 58, the obstacle detection flag may be set to "1". Further, if the step candidate is detected in the first detection area of only one or some of ultrasonic sensors 58, the change of the detection area to the second detection area may be performed in only such one or some of ultrasonic sensors 58 which detect that step candidate.

Figure 10:
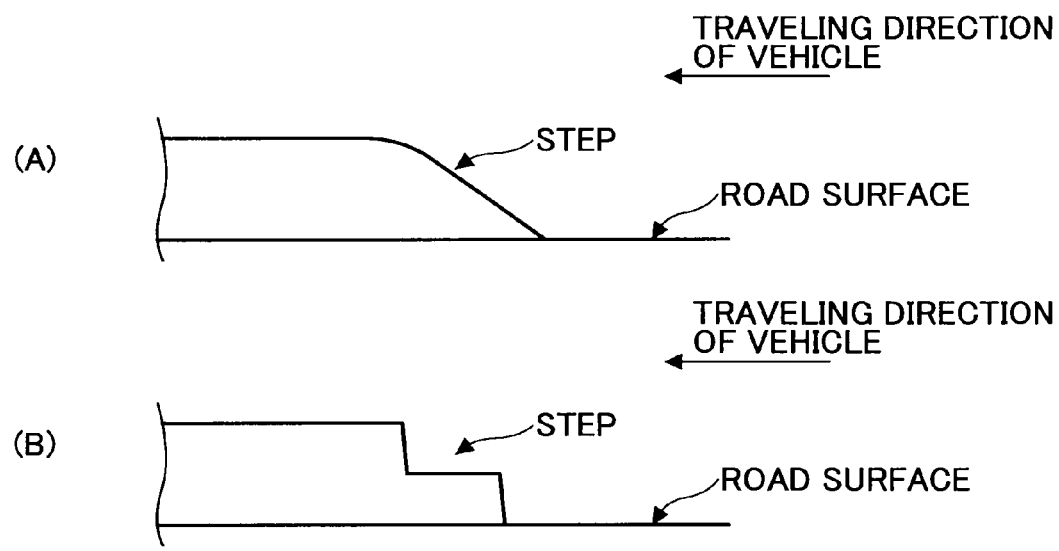
FIG. 10 is a diagram for illustrating two examples of the steps whose heights are varied.

Further, the detection distance D2 of the second detection area may be varied as a function of a distance of the step candidate detected by the ultrasonic sensor 58. For example, if the distance of the step candidate is D' (D2<D'<D1), the detection distance D2 of the second detection area may be set to D'. Of course, the detection distance D2 of the second detection area may be obtained by subtracting a predetermined margin from the detected distance D' of the step candidate. In this case, the detection distance D2 of the second detection area may be varied in accordance with the change in height of the step candidate which may occur due to the reverse movement of the vehicle. This is because in the case of the step shown in FIG. 10A and FIG. 10B the distance of the step candidate (i.e., the height of the step candidate) detected by the ultrasonic sensor 58 varies when the vehicle moves in reverse. In this case, the parking assisting ECU 12B varies the detection distance D2 of the second detection area as a function of a distance of the step candidate detected by the ultrasonic sensor 58 within such a range in which the reduced amount Δ of the detection distance D does not exceed H0×1/sin α (or a value obtained by subtracting a margin from H0×1/sin α), where H0 is the minimum height of the lower portion of the vehicle (see FIG. 9A).

Figure 11:
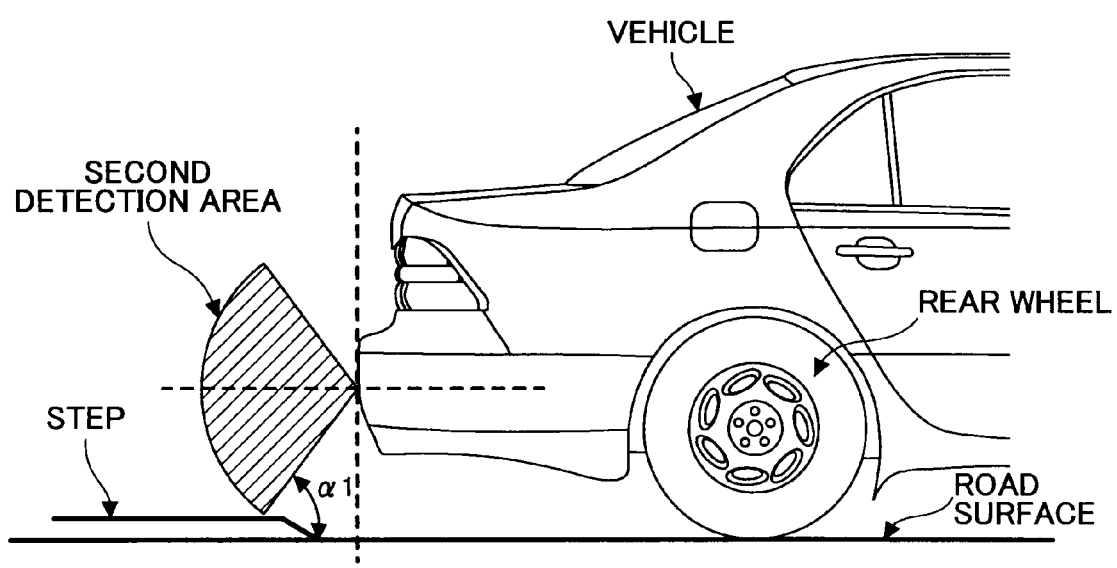
FIG. 11 is a diagram for illustrating a variant way of setting a second detection area.

Further, the second detection area may be changed by increasing the inclination angle α as shown in FIG. 11. In this case, the inclination angle α2 of the second detection area is set so as not to detect the step candidate in light of the foregoing. Even in this case, it is possible to discriminate between an obstacle and a step with high accuracy.

Third Embodiment

Figure 12:
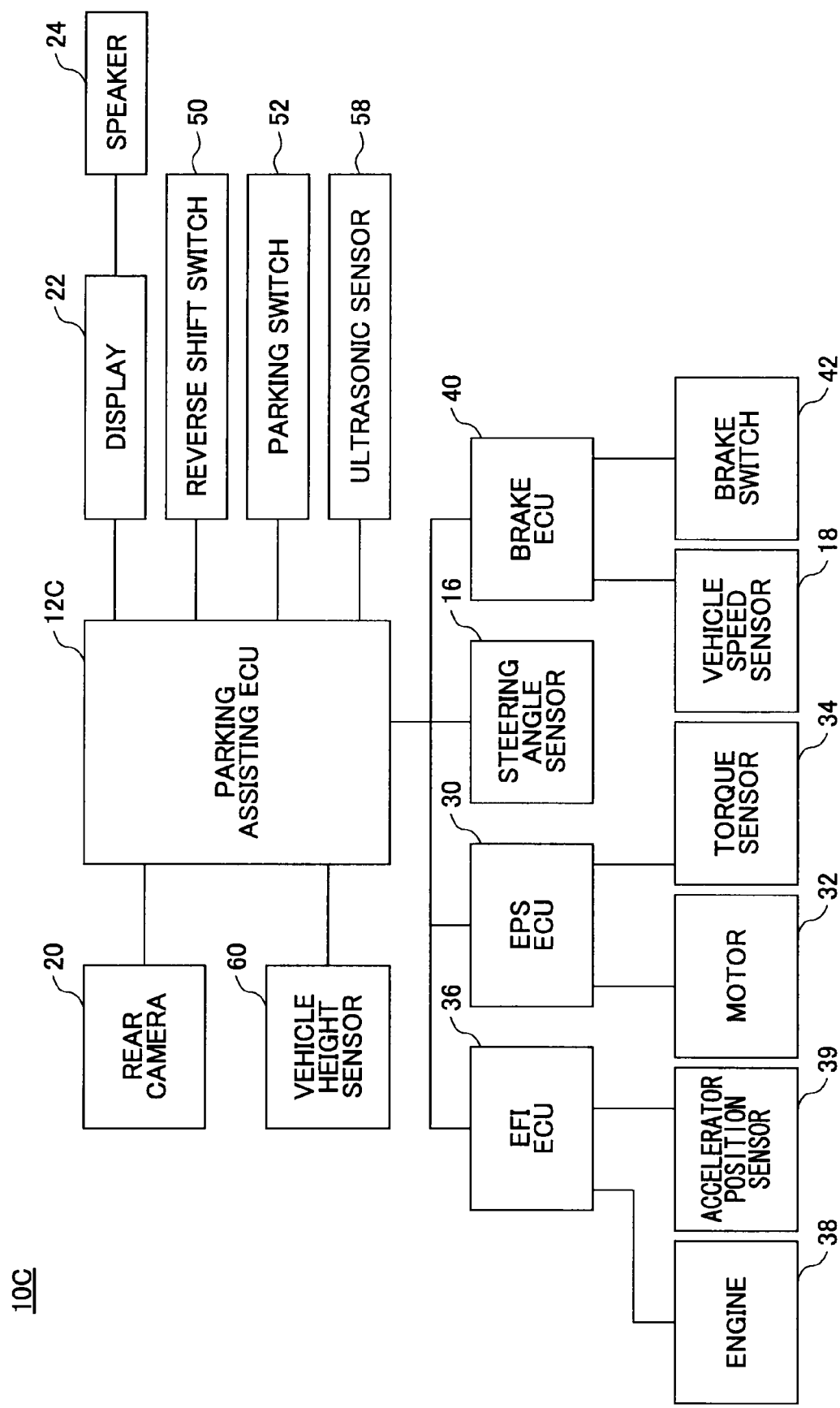
FIG. 12 is a system diagram of an embodiment of a vehicle drive assist apparatus 10C according to the third embodiment.

FIG. 12 is a system diagram of an embodiment of a vehicle drive assist apparatus 10C according to the third embodiment. As shown in FIG. 12, the vehicle drive assist apparatus 10C is comprised mainly of an electronic control unit 12C (hereafter referred to as a parking assisting ECU 12C). It is noted that other fundamental processes implemented by the parking assisting ECU 12C may be the same as the respective steps in FIGS. 3, 5 and 8 with reference to the first and second embodiments. Further, the definitions of the first and second detection area, etc., may be the same as those in the above-mentioned second embodiment unless otherwise specified.

In this third embodiment, the vehicle drive assist apparatus 10C differs from the vehicle drive assist apparatus 10B according to the second embodiment in that a vehicle height sensor 60 is provided, as shown in FIG. 12. Other components may be the same as those in the vehicle drive assist apparatus 10B according to the second embodiment, and thus explanation is omitted by giving them the same referential numerals.

The vehicle height sensor 60 is a sensor for measuring the distance between the vehicle and the road surface, and may be the non-contact distance sensor 56 according to the first embodiment. For example, the vehicle height sensor 60 may emit detection waves such as laser light or the like, capture the reflected light as a light spot shift on a photo detector, and calculate the displacement from the road surface using a triangular method. The vehicle height sensor 60 may be provided one for each of the wheels of the vehicle.

Figure 13:
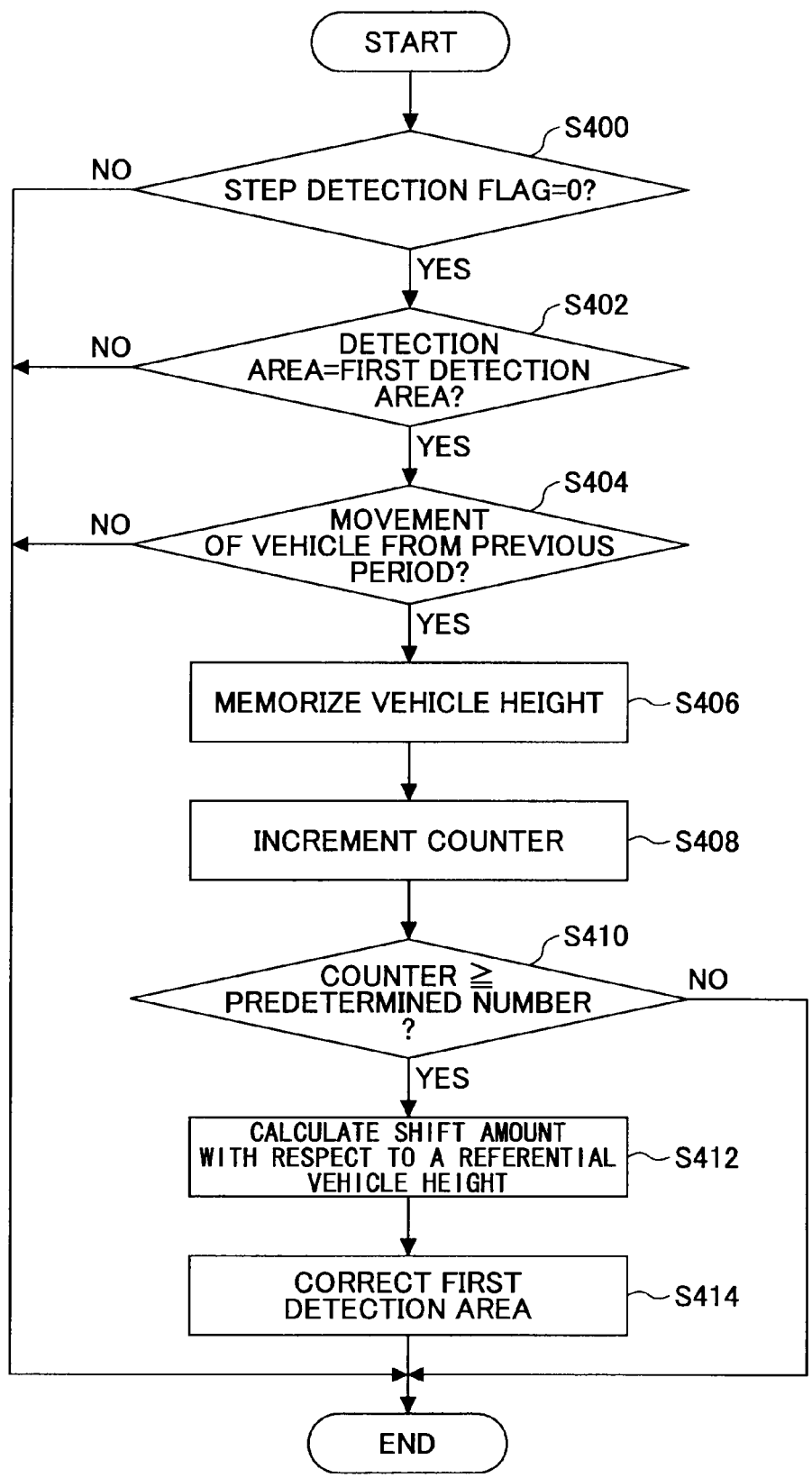
FIG. 13 is a flowchart of a process for correcting the detection area of the ultrasonic sensor 58 executed by a parking assisting ECU 12C according to the third embodiment.

FIG. 13 is a flowchart of a process for correcting the detection area of the ultrasonic sensor 58 executed by a parking assisting ECU 12C according to the third embodiment. The process routine shown in FIG. 13 is a process routine for determining the first detection area of the ultrasonic sensor 58 according to the above-mentioned second embodiment. The process routine shown in FIG. 13 may be executed prior to the starting of the process routine shown in FIG. 8, or may be executed in parallel with the process routine shown in FIG. 8. Here, it is assumed that the process routine shown in FIG. 13 is executed in parallel with the process routine shown in FIG. 8. Further, the process routine shown in FIG. 13 may be executed until correction for the reverse drive assisting control at a time is performed once. Alternatively, the process routine shown in FIG. 13 may be executed repeatedly and continuously during reverse drive assisting control, considering that the distance to the flat road surface with respect to the vehicle may be varied even during reverse drive assisting control execution.

In step 400, the parking assisting ECU 12C determines whether the step detection flag is "0". If it is determined that the step detection flag is "0", the process routine goes to step 402. On the other hand, if the step detection flag is "1" (i.e., the step was detected before the current period), it is not necessary to correct the detection area in such a situation, and thus the process routine of this period terminates.

In step 402, the parking assisting ECU 12C determines whether the current detection area of the ultrasonic sensor 58 is a first detection area (i.e., a normal detection area). If it is determined that the current detection area of the ultrasonic sensor 58 is the first detection area, the process routine goes to step 404. Otherwise (i.e., if the current detection area of the ultrasonic sensor 58 is the second detection area), it is not necessary to correct the detection area in such a situation, and thus the process routine of this period terminates.

In step 404, the parking assisting ECU 12C determines whether the vehicle has moved during an interval from the previous period (i−1) to the current period (i) based on output signals of the vehicle speed sensor 18. For example, the parking assisting ECU 12C may calculate the travel distance d (i) based on output signals of the vehicle speed sensor 18, and determine whether the calculated travel distance d (i) is greater than or equal to a predetermined value. Although the predetermined value depends on a resolution of output signals of the vehicle speed sensor 18, it may be an infinitesimal distance (0.05 m, for example). If it is determined that the vehicle has moved during an interval from the previous period (i−1) to the current period (i), the process routine goes to step 406. On the other hand, if it is determined that the vehicle is stationary, the process routine of this period terminates.

In step 406, the parking assisting ECU 12C stores the output value h (i) of the vehicle height sensor 60 at this period. In this way, the parking assisting ECU 12C stores a plurality of the output values h of the vehicle height sensor 60 during the movement of the vehicle. The storing way may be FIFO (first-in, first-out) type.

In step 408, the parking assisting ECU 12C increments a counter. The initial value of the counter may be 1, and the counter may be initialized when the parking switch 52 is turned on, for example.

In step 410, the parking assisting ECU 12C determines whether the counter is greater than or equal to a predetermined value. This determination process is for determining whether the sampling number of output values of the vehicle height sensor 60 is sufficient. Thus, the predetermined value may be determined from this view point. If it is determined that the counter is greater than or equal to the predetermined value, the process routine goes to step 412. Otherwise, the process routine of this period terminates.

In step 412, the parking assisting ECU 12C calculates a shift amount $\Delta h$ (=h0−h1) of the current vehicle height h1 with respect to a referential vehicle height h0 using a predetermined number of the output values h of the vehicle height sensor 60 obtained in step 406. It is noted that when the current vehicle height h1 is calculated, the predetermined number of the output values h of the vehicle height sensor 60 may be averaged or filtered so as to remove inference of noise or the like.

Figure 14:
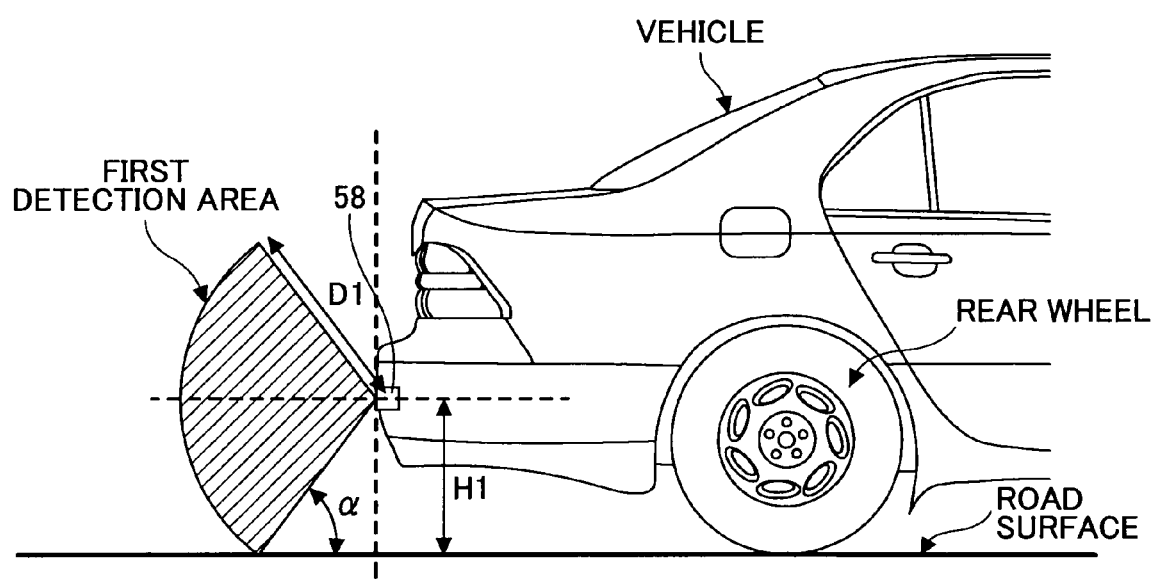
FIG. 14 is a diagram for illustrating a manner in which a first detection area is corrected.

In step 414, the parking assisting ECU 12C corrects the first detection area of the ultrasonic sensor 58 based on the shift amount $\Delta h$ of the current vehicle height h1 with respect to a referential vehicle height h0 calculated in step 412. Here, it is assumed that a default of the first detection area of the ultrasonic sensor 58 is set with reference to the referential vehicle height such that it becomes closer to but smaller than the upper limit area in which flat road surfaces can be detected. In this case, the parking assisting ECU 12C corrects the first detection area with reference to the current vehicle height h1 such that the first detection area becomes closer to but smaller than the upper limit area in which flat road surfaces can be detected. The correction of the first detection area may be implemented by correcting the detection distance D and/or the inclination angle $\alpha$. In the case of correcting the detection distance D, the corrected detection distance D may be obtained by subtracting $\Delta h/\sin \alpha$ from the default D1. In other words, the first detection area of the ultrasonic sensor 58 may be corrected such that the detection distance D of the first detection area of the ultrasonic sensor 58 becomes nearly the distance to the flat road surface (i.e., the detection distance D becomes nearly equal to H1/sin $\alpha$). It is noted that H1 is the height of the mounting position of the ultrasonic sensor 58 from the road surface and varies as a function of the vehicle height, as shown in FIG. 14. If the shift amount $\Delta h$ is positive, that is to say, if the vehicle height decreases, the detection distance D of the first detection area is corrected in a negative direction. On the other hand, f the shift amount $\Delta h$ is negative, that is to say, if the vehicle height increases, the detection distance D of the first detection area is corrected in a positive direction.

According to the vehicle drive assist apparatus 10C of this third embodiment, the following effect among others can be obtained in addition to the above-mentioned effects according to the first and second embodiments.

As mentioned above, since the first detection area of the ultrasonic sensor 58 is corrected in accordance with the change in a vehicle height which may occur due to change in loadage or loading or unloading of passengers or the like, it becomes possible to detect the step candidate (and thus the step) on the flat road surface with high accuracy. In other words, according to this third embodiment, it is possible to avoid such inconvenience which would occur when the step which cannot be surmounted without torque-up (i.e., the target step to be surmounted) cannot be detected due to increase in vehicle height with respect to the referential vehicle height, as well as such inconvenience which would occur when the flat road surface is detected in error as a step candidate or a step due to decrease in vehicle height with respect to the referential vehicle height.

It is noted that in the respective embodiments mentioned above the "torque-up means" recited in appended claim is implemented by the EFI ECU 36 in association with the engine 38, and the "step detecting means" recited in appended claim is implemented by the parking assisting ECU 12A, 12B or 12C in association with the non-contact distance sensor 56 or the ultrasonic sensor 58. Further, the "switching means" recited in appended claim is implemented by the parking assisting ECU 12A, 12B or 12C, the "first status" recited in appended claim is formed when the parking assisting ECU 12A, 12B or 12C sets the step detection flag to "1" in step 200 in FIG. 5, and the "second status" recited in appended claim is formed when the parking assisting ECU 12A, 12B or 12C maintains the step detection flag "0" in step 200 in FIG. 5. Further, the "distance measuring means" recited in appended claim is implemented by the ultrasonic sensor 58, and the "vehicle height detecting means" recited in appended claim is implemented by the vehicle height sensor 60.

The present invention is disclosed with reference to the preferred embodiments. However, it should be understood that the present invention is not limited to the above-described embodiments, and variations and modifications may be made without departing from the scope of the present invention.

For example, although in the above-described embodiments it is assumed that the vehicle is provided with an automatic transmission and the engine as a driving source of the wheels, the present invention can be applied to a hybrid vehicle or an electric vehicle having an electric motor as a driving source of the wheels. In this case, torque-up may be implemented by increasing the rotation torque of the electric motor with respect to the normal state. It is noted that an electric motor may be incorporated in each of the wheels independently, or the electric motor may be shared among the wheels.

Further, although in the above-described embodiments the reverse drive assisting control is initiated when the parking switch 52 is turned on, the present invention is not limited to this configuration. For example, the reverse drive assisting control may be initiated if the vehicle speed becomes 0 and after that the reverse shift switch 50 is turned on in such a situation where parking space around the vehicle is detected by the ultrasonic sensor or an image sensor or it is determined that the vehicle position is located in the parking area based on the map data of a navigation device, even in the condition where the parking switch 52 is not turned on. In this case, such a configuration where there is no parking switch 52 can be contemplated.

Further, although in the above-described embodiments the reverse driving is assisted during the parking operation, the present invention is applied to assistance for the reverse driving other than parking operation or assistance for forward driving. For example, in such parking assistance in which the vehicle moves in a forward direction toward the parking start position and then moves in reverse toward the target parking position, the present invention is applied to the assistance during the forward driving as well as the reverse driving. It is noted that in the case of the forward driving, the forward driving creep torque may be increased in a similar manner. Further, in the case of the forward driving, the step may be detected using an ultrasonic sensor disposed so as to detect the forward area which is forward with respect to the front wheels of the vehicle, for example.

Further, although in the above-described embodiments the step detection means is implemented by the non-contact distance sensor 56 or the ultrasonic sensor 58, the present invention is not limited to this configuration. For example, the image of the step which may be included in the vehicle rear image imaged by the rear camera 20 may be recognized using an image recognition technique, for example. In this case, the distance between the step and the rear wheel may be calculated by using a stereo camera as a rear camera 20.

The present application is based on Japanese Priority Application No. 2007-39793, filed on Feb. 20, 2007, the entire contents of which are hereby incorporated by reference.

The invention claimed is:

1. A vehicle drive assist apparatus for assisting in driving a vehicle by varying a drive torque of wheels, comprising:
   a torque controller configured to increase the drive torque;
   a step detector configured to detect a step which may exist on a road surface in a traveling direction of the vehicle; and
   a switch configured to switch a status of control between a first status in which the torque controller is permitted to operate and a second status in which the torque controller is restricted to operate, wherein
   the switch forms the first status if the step is detected by the step detector,
   the step detector includes a distance measuring device configured to detect a distance with respect to an object within a detection area which has a shape of a sector in a side view, and
   if the step detector detects a candidate of the step in said detection area, the step detector makes the detection area smaller such that the detected candidate of the step is not included in the smaller detection area, and the step detector determines whether the detected candidate of the step is a step based on the detection result using the smaller detection area.

2. The vehicle drive assisting apparatus as claimed in claim 1,
   wherein the step detector is configured to detect the step before the wheels of the vehicle reach the step.

3. The vehicle drive assisting apparatus as claimed in claim 1,
   wherein the step detector is configured to detect the candidate of the step as a step if there is no object detected in the smaller detection area during a predetermined travel distance of the vehicle after the detection of the candidate of the step.

4. The vehicle drive assisting apparatus as claimed in claim 3,
   wherein the predetermined travel distance is set to a distance which corresponds to a reduced distance in making the detection area smaller.

5. The vehicle drive assisting apparatus as claimed in claim 4, wherein the smaller detection area is a detection area which is made smaller by an amount corresponding to a height of the candidate of the step.

6. The vehicle drive assisting apparatus as claimed in claim 5,
wherein the predetermined travel distance is set to a distance which corresponds to the height of the candidate of the step.

7. The vehicle drive assisting apparatus as claimed in claim 1,
wherein the step detector is configured to determine the candidate of the step as an obstacle other than a step if there is an object detected in the smaller detection area during a predetermined travel distance of the vehicle after the detection of the candidate of the step.

8. The vehicle drive assist apparatus as claimed in claim 1, further comprising:
a vehicle height detector configured to detect a height of the vehicle with respect to a road surface,
wherein the step detector is configured to correct the detection area in accordance with the height detected by the vehicle height detector.

9. A vehicle drive assist apparatus for assisting in driving a vehicle by varying a drive torque of wheels,
wherein said vehicle drive assist apparatus uses a sensor for detecting a distance between the vehicle and an object within a detection area of the sensor which has a shape of a sector in a side view, and if a candidate of the step is detected in said detection area of the sensor, said vehicle drive assist apparatus makes the detection area smaller such that the detected candidate of the step is not included in the smaller detection area, and said vehicle drive assist apparatus determines whether the detected candidate of the step is a step based on the detection result using the smaller detection area, and as the result of this determination, if it is determined that the step exists on the road surface in the traveling direction of the vehicle, said vehicle drive assist apparatus permits a torque-up operation for increasing the drive torque.

10. A vehicle drive assisting method of assisting in driving a vehicle by varying a drive torque of wheels, comprising:
determining whether a step exists on a road surface in a traveling direction of the vehicle; and
permitting a torque-up operation for increasing the drive torque if it is determined that the step exists on the road surface in the detecting,
wherein in said detecting a sensor is used for detecting a distance between the vehicle and an object which is within a detection area of the sensor which has a shape of a sector in a side view, and if a candidate of the step is detected in said detection area of the sensor, the detection area is made smaller such that the detected candidate of the step is not included in the smaller detection area, and it is determined whether the detected candidate of the step is a step based on the detection result using the smaller detection area.

11. A non-transitory computer readable storage medium on which a computer readable program which makes a computer execute the method claimed in claim 10 is recorded.

* * * * *